United States Patent [19]
Chu

[11] Patent Number: 5,532,077
[45] Date of Patent: Jul. 2, 1996

[54] RECHARGEABLE POSITIVE ELECTRODE

[75] Inventor: May-Ying Chu, Oakland, Calif.

[73] Assignee: PolyPlus Battery Company, Inc., Berkeley, Calif.

[21] Appl. No.: 450,988

[22] Filed: May 25, 1995

Related U.S. Application Data

[62] Division of Ser. No. 344,384, Nov. 23, 1994.

[51] Int. Cl.$^6$ ..................... H01M 4/60
[52] U.S. Cl. .............. 429/102; 429/103; 429/104; 429/105; 429/212; 429/218; 429/233
[58] Field of Search ............... 429/218, 212, 429/213, 233, 192, 190, 194, 104, 102, 103, 105

[56] References Cited

U.S. PATENT DOCUMENTS

| | | | |
|---|---|---|---|
| 3,532,543 | 10/1970 | Nole et al. | 136/6 |
| 3,907,591 | 9/1975 | Lauck | 136/6 LN |
| 3,915,743 | 10/1975 | Lauck | 136/6 LN |
| 3,953,231 | 4/1976 | Farrington et al. | 136/6 LN |
| 4,410,609 | 10/1983 | Peled et al. | 429/105 |
| 4,469,761 | 9/1984 | Bennett et al. | 429/50 |
| 4,833,048 | 5/1989 | Dejonghe et al. | 429/104 |
| 5,162,175 | 11/1992 | Visco et al. | 429/192 |

OTHER PUBLICATIONS

Societe des Accumulateurs Fixes et de Traction, "Lithium-sulfur battery" Abstracts 111055d, Chemical Abstracts 66: 10360; 1967. no month available.

DeGott, P., "Polymere Carbone–Soufre Synthese Et Proprietes Electrochimiques," Doctoral Thesis at l'Institut National Polytechnique de Grenoble, (Date of Defense 19 Jun. 1986).

Lauck, H., "Storage battery with lithium anode and sulfur cathode," Abstract #9855s, Chemical Abstracts, 80: 467–468; 1974. No month available.

Peled et al.,"Rechargeable Lithium–Sulfur Battery (Extended Abstact)", Journal of Power Source, 26: 269–271, 1989. No month available.

Peled et al.; "Lithium–Sulfur Battery: Evaluation of Dioxolane–Based Electrolytes", J. Electrochem., Soc., 136(6): 1621–1624, Jun. 1989.

Peramunage and Licht, "A Solid Sulfur Cathode for Aqueous Batteries"; Science 261: 1029–1032, Aug. 20, 1993.

Rauh et al., "Formation of Lithium Polysulfides in Aprotic Media", J. Inorg., Nuc. Chem., 39: 1761–1765, 1977. No month available.

Rauh et al. "A Lithium/Dissolved Sulfur Battery with an Organic Electrolyte"; J. Electrochem. Soc., 126(4): 523–527, Apr. 1979.

Yamin and Peled, "Electrochemistry of Nonaqueous Lithium/Sulfur Cell", J. Power Sources, 9: 281–287, 1983. No month available.

Yamin et al., "Lithium Sulfur Battery,": J. Electrochem. Soc., 135(5): 1045–1048, May 1988.

*Primary Examiner*—Bruce F. Bell
*Attorney, Agent, or Firm*—Hickman Beyer & Weaver

[57] ABSTRACT

Disclosed are battery cells comprising a sulfur-based positive composite electrode. Preferably, said cells are secondary cells, and more preferably thin film secondary cells. In one aspect, the cells can be in a solid-state or gel-state format wherein either a solid-state or gel-state electrolyte separator is used. In another aspect of the invention, the cells are in a liquid format wherein the negative electrode comprises carbon, carbon inserted with lithium or sodium, or a mixture of carbon with lithium or sodium. The novel battery systems of this invention have a preferred operating temperature range of from −40° C. to 145° C. with demonstrated energies and powers far in excess of state-of-the-art high-temperature battery systems.

37 Claims, 8 Drawing Sheets

Schematic of a Li / electrolyte separator / sulfur electrode cell.

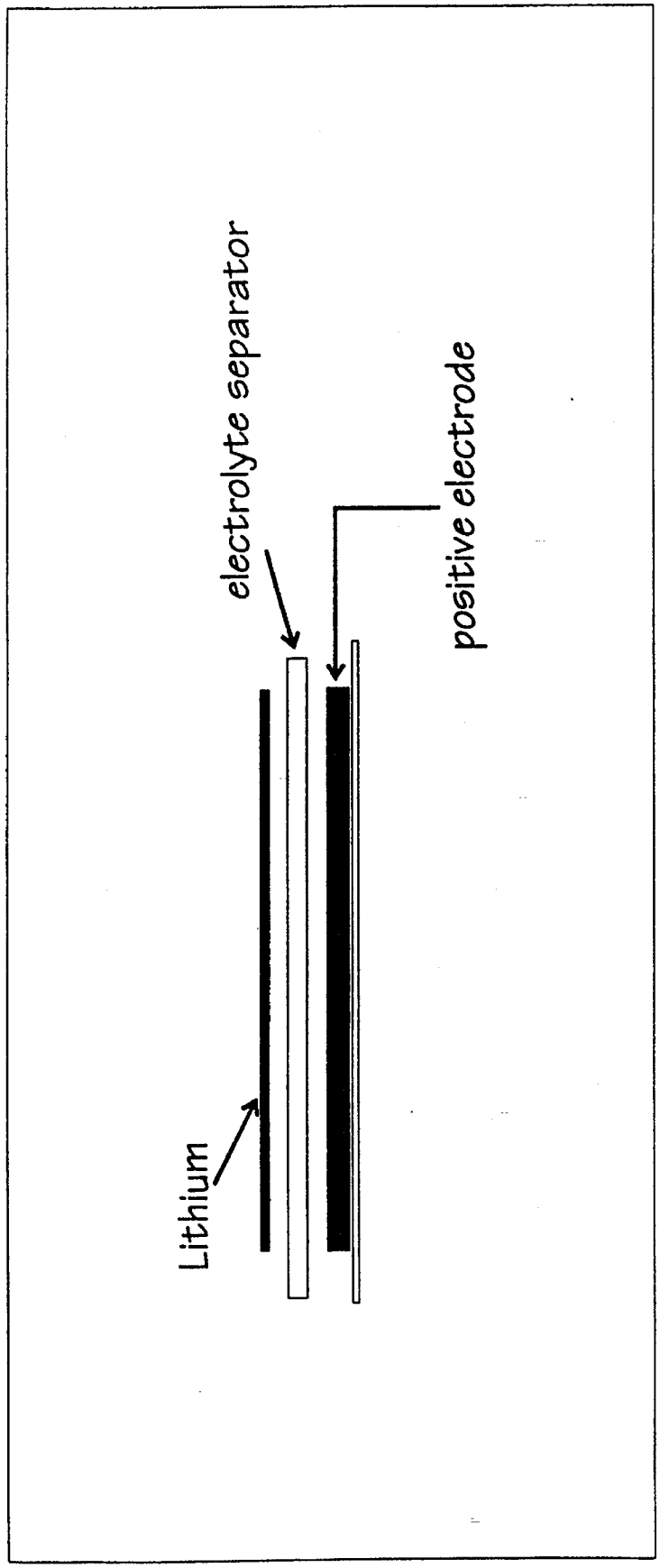
Figure 1. Schematic of a Li / electrolyte separator / sulfur electrode cell.

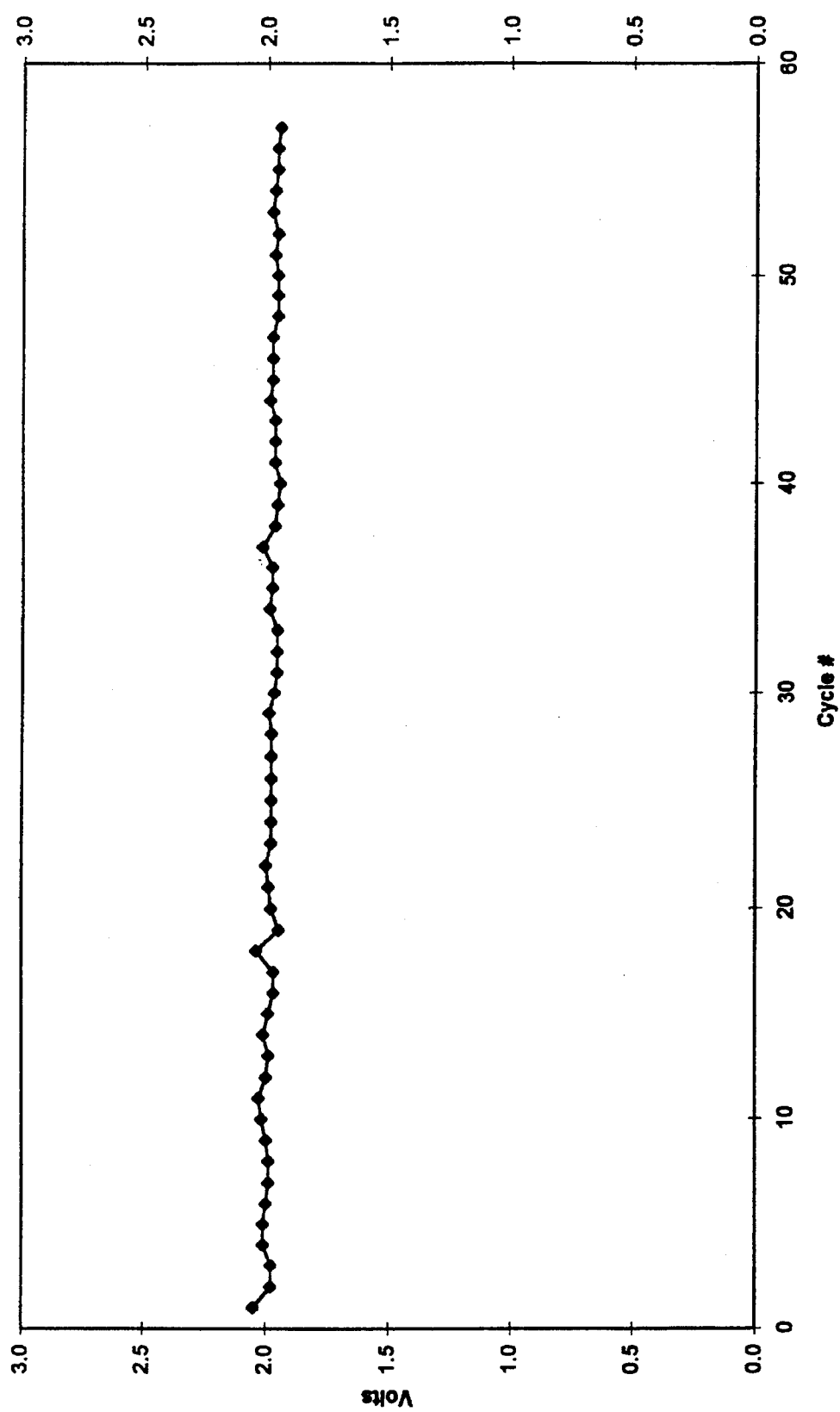
Figure 2. End of discharge voltage vs. number of recharge cycles (330 mAh/gm of sulfur, 30°C).

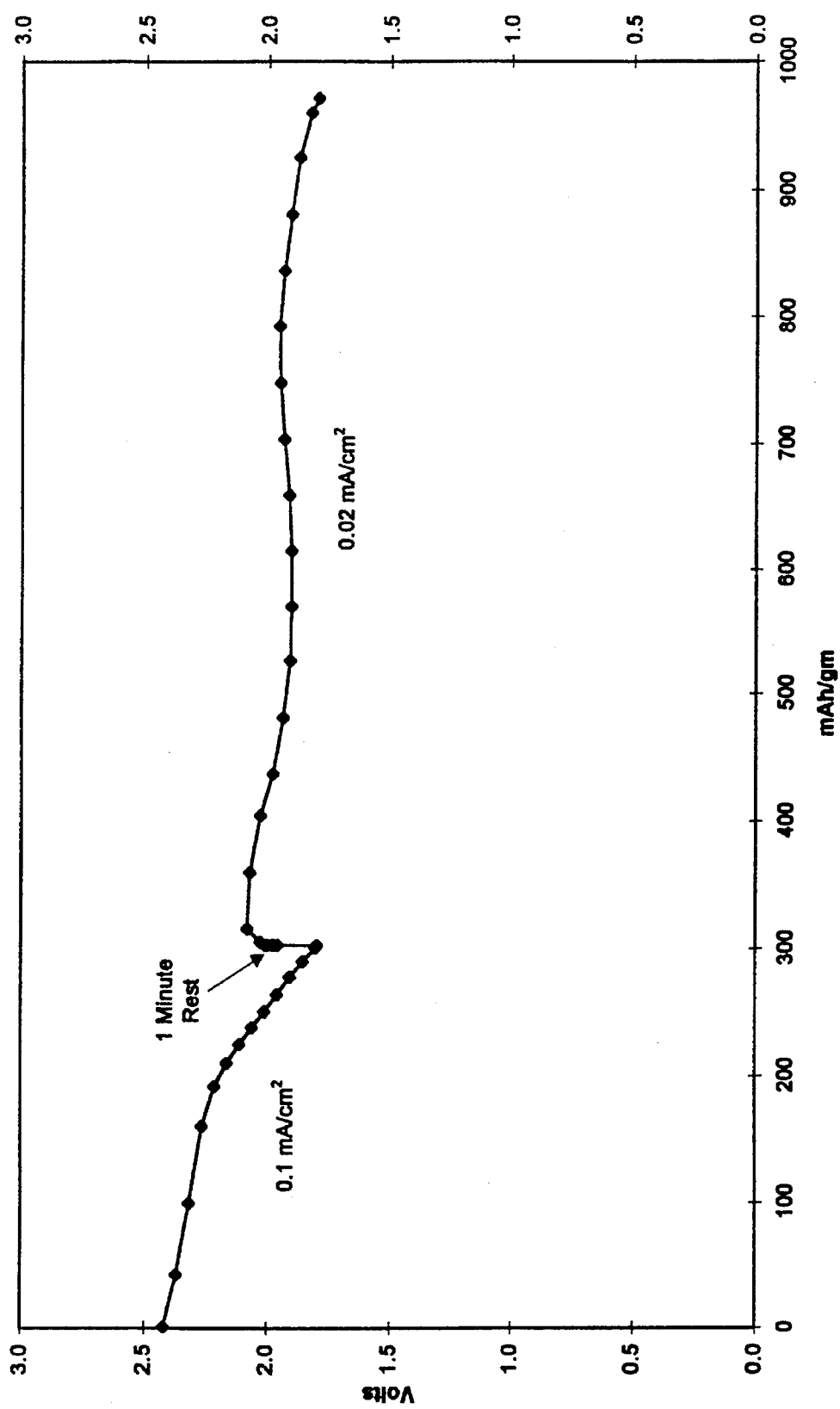
Figure 3. Voltage vs. mAh/gm of sulfur for first discharge (30°C).

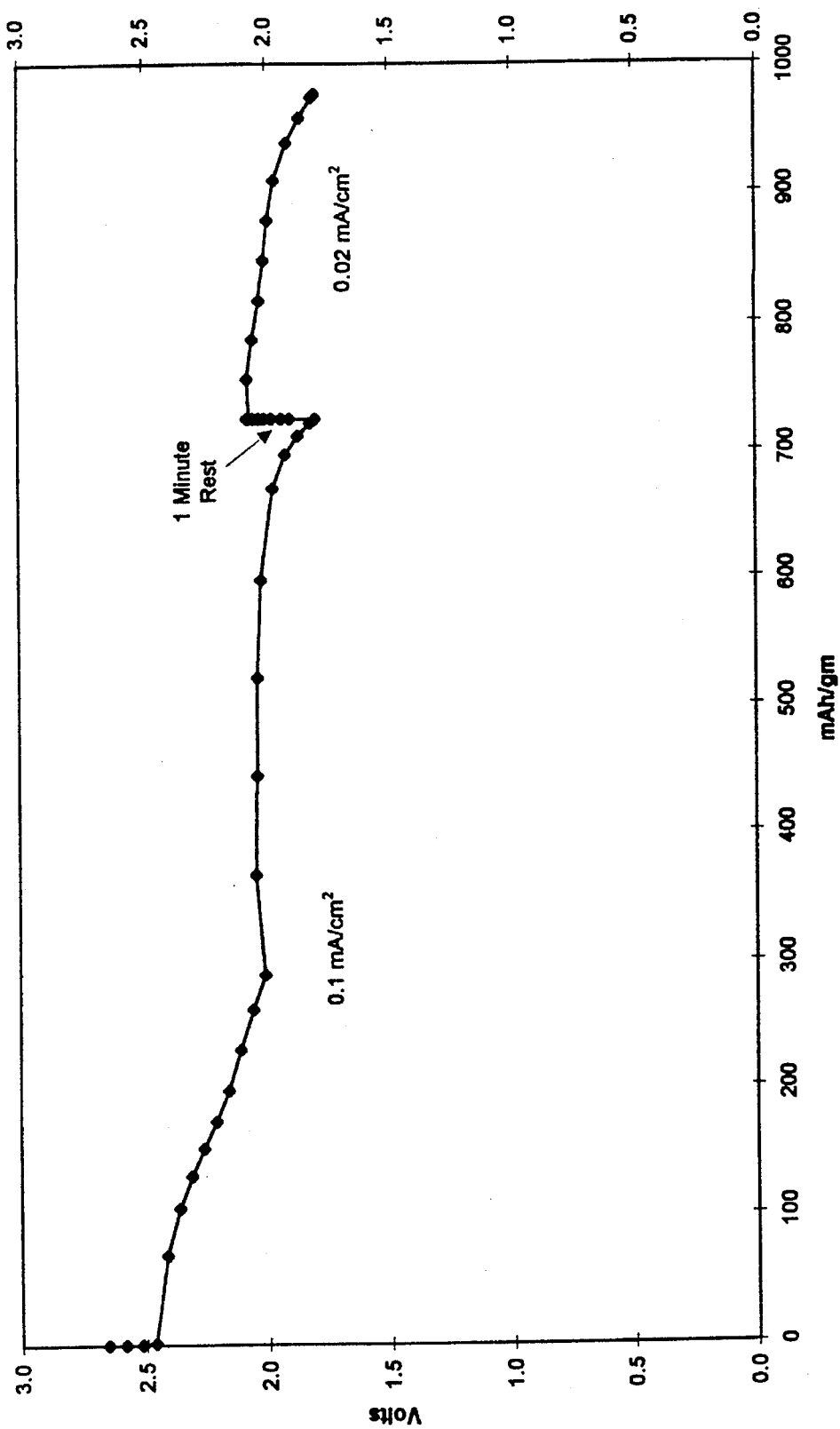
Figure 4. Voltage vs. mAh/gm of sulfur for first discharge (30°C, gel electrolyte separator).

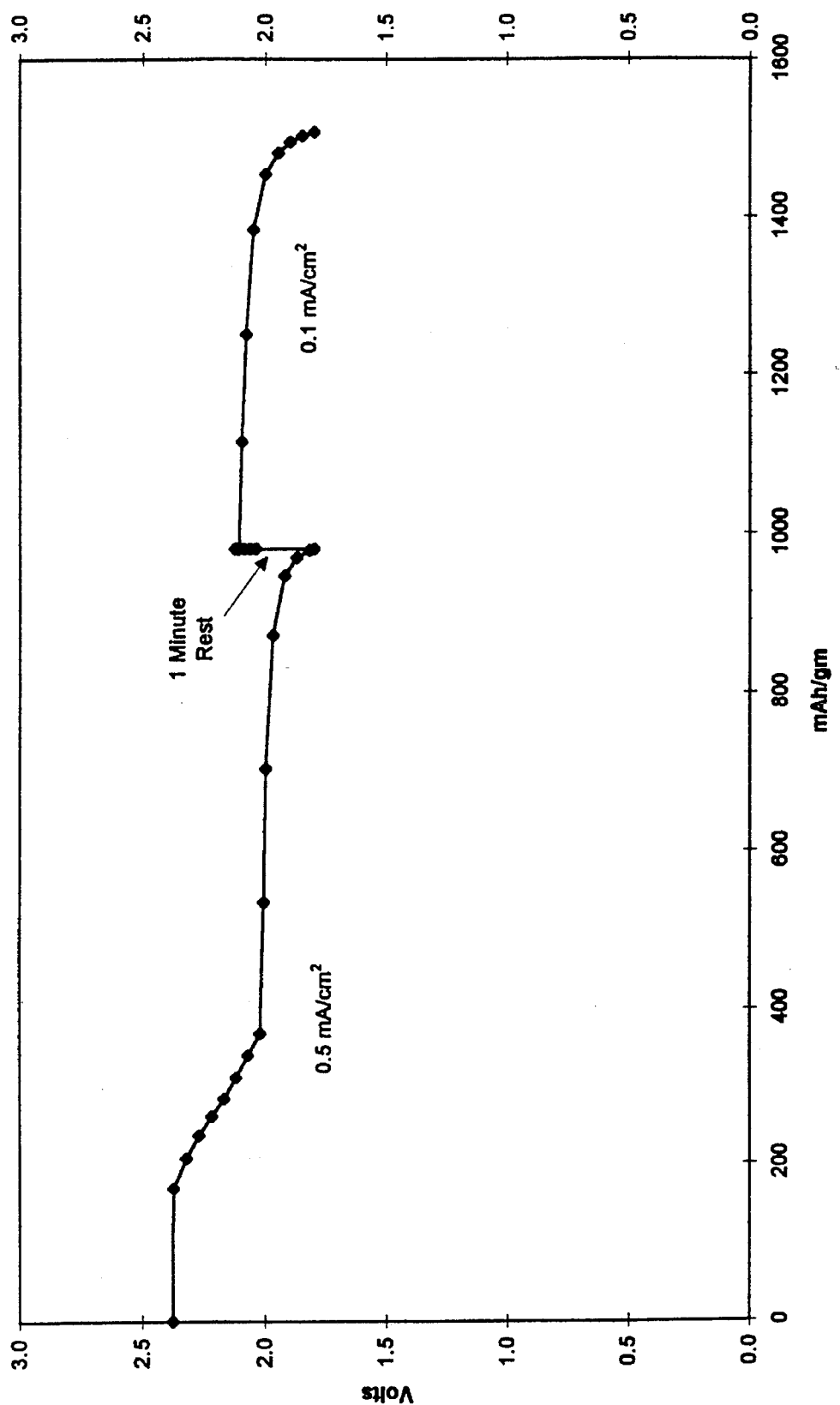
Figure 5. Voltage vs. mAh/gm of sulfur for first discharge (90°C).

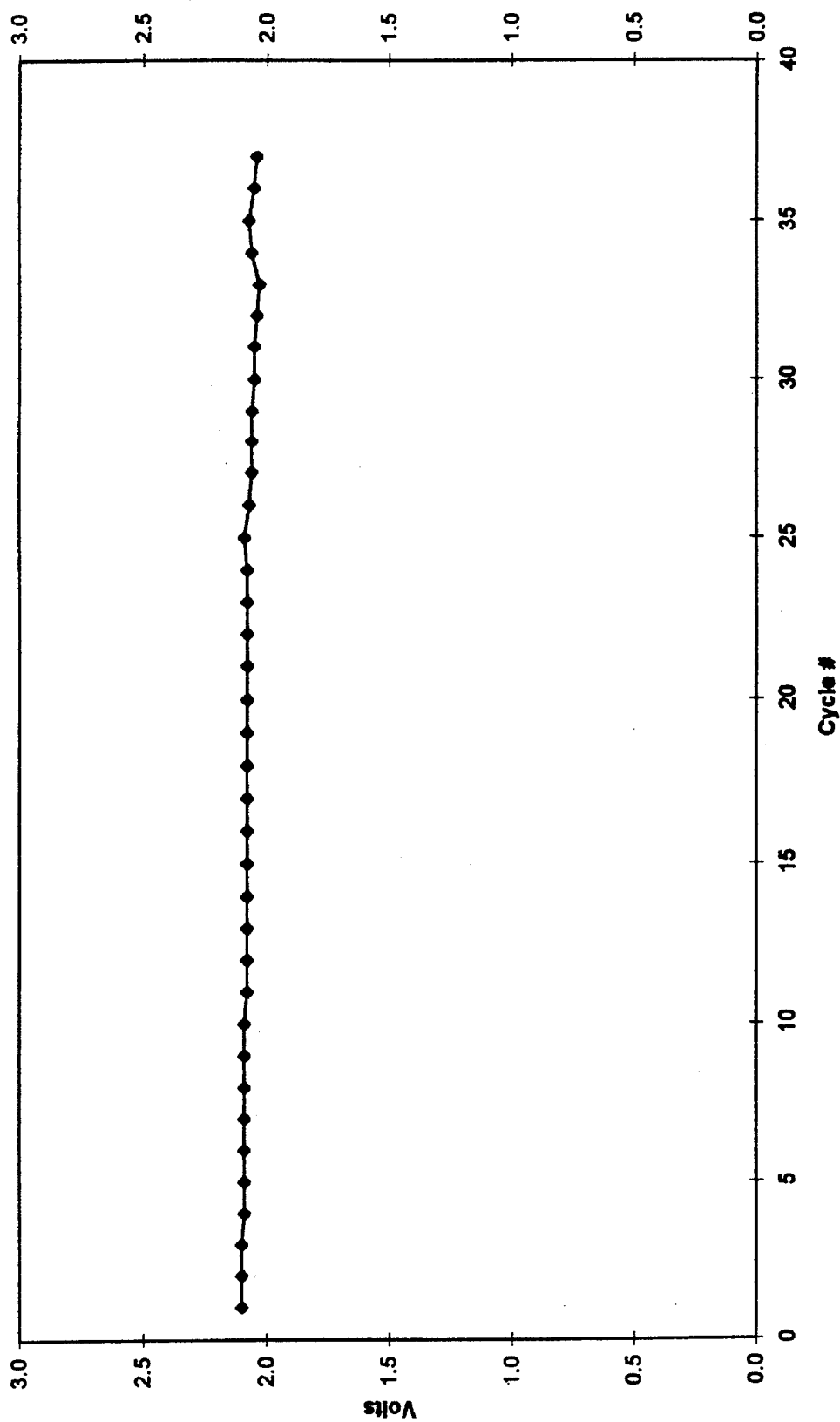
Figure 6. End of discharge voltage vs. number of recharge cycles (400 mAh/gm sulfur, 90°C).

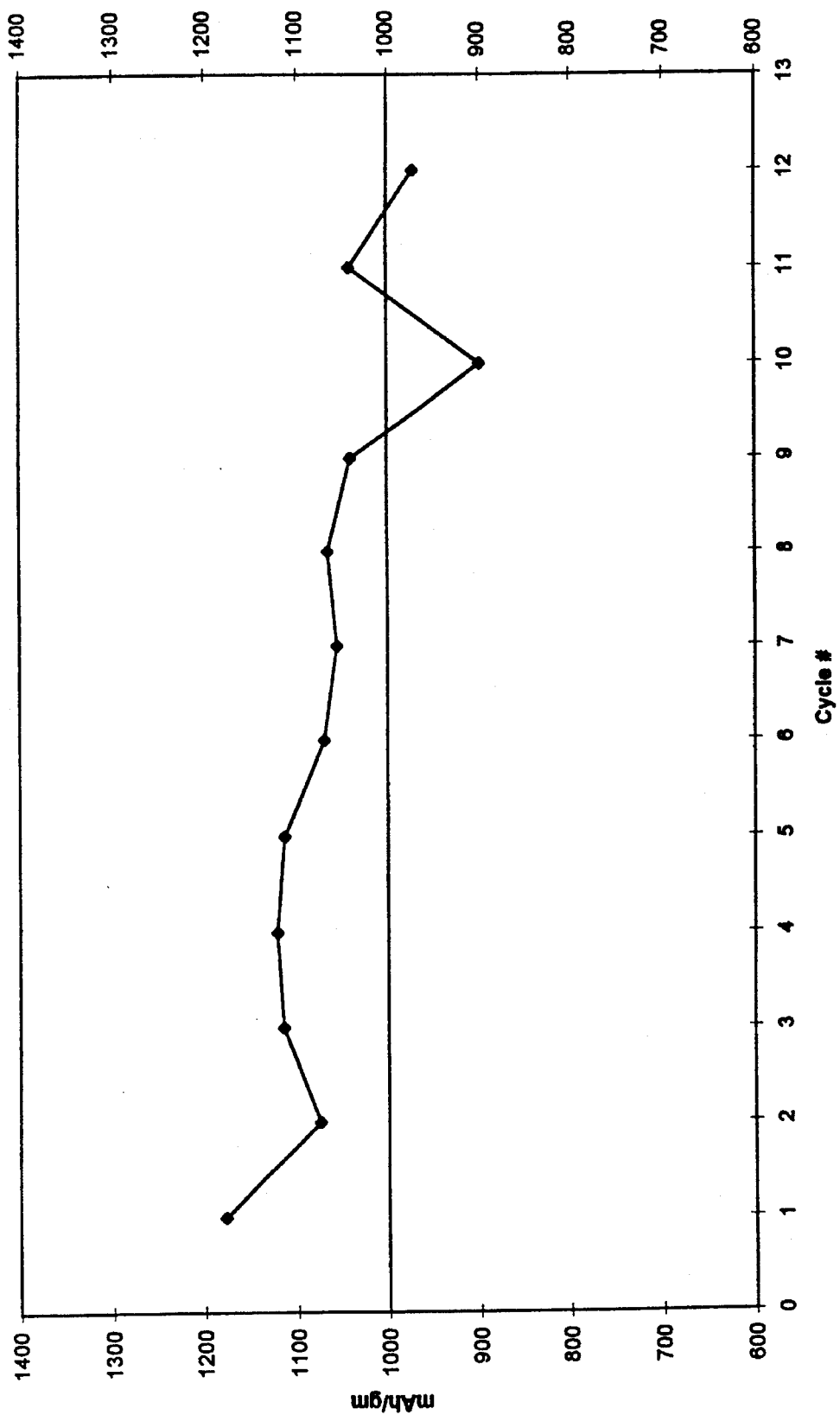
Figure 7. mAh/gm of sulfur vs. number of recharge cycles (90°C).

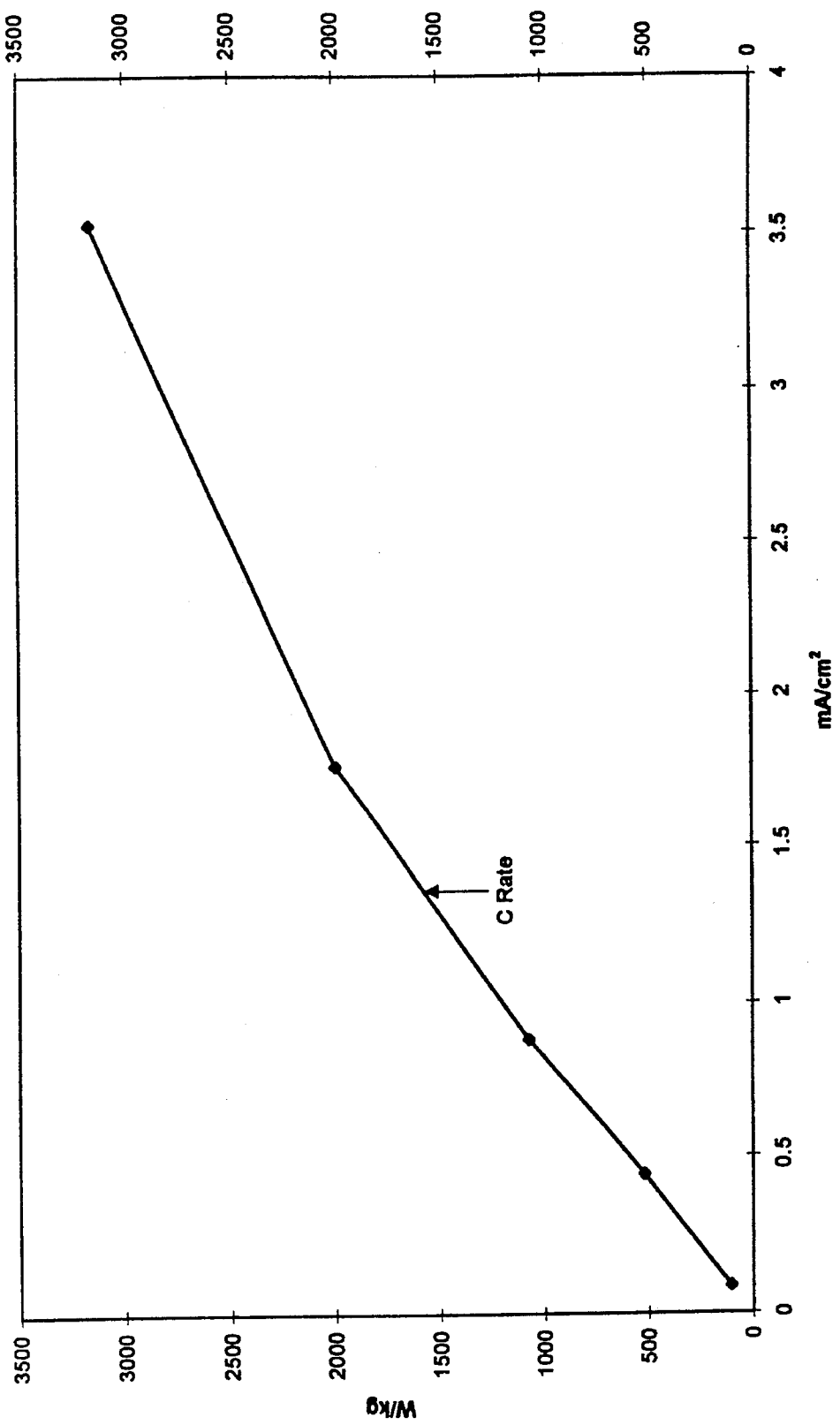
Figure 8. Specific power of the positive electrode vs. current density (90°C).

RECHARGEABLE POSITIVE ELECTRODE

This is a divisional of copending application Ser. No. 08/344,384 filed on Nov. 23, 1994.

FIELD OF USE

This invention relates generally to a positive electrode characterized by active-sulfur. The electrodes are preferably rechargeable, and in some preferred embodiments are constructed in a thin-film format. Various negative electrodes, such as, alkali metal, alkaline earth metal, transition metal, and carbon insertion electrodes, among others, can be coupled with the positive electrode to provide battery cells, preferably having high specific energy (Wh/kg) and energy density (Wh/l).

BACKGROUND OF THE INVENTION

The rapid proliferation of portable electronic devices in the international marketplace has led to a corresponding increase in the demand for advanced secondary batteries. The miniaturization of such devices as, for example, cellular phones, laptop computers, etc., has naturally fueled the desire for rechargeable batteries having high specific energies (light weight). Mounting concerns regarding the environmental impact of throwaway technologies, has caused a discernible shift away from primary batteries and towards rechargeable systems.

In addition, heightened awareness concerning toxic waste has motivated, in part, efforts to replace toxic cadmium electrodes in nickel/cadmium batteries with the more benign hydrogen storage electrodes in nickel/metal hydride cells. For the above reasons, there is a strong market potential for environmentally benign secondary battery technologies.

Secondary batteries are in widespread use in modern society, particularly in applications where large amounts of energy are not required. However, it is desirable to use batteries in applications requiring considerable power, and much effort has been expended in developing batteries suitable for high specific energy, medium power applications, such as, for electric vehicles and load leveling. Of course, such batteries are also suitable for use in lower power applications such as cameras or portable recording devices.

At this time, the most common secondary batteries are probably the lead-acid batteries used in automobiles. Those batteries have the advantage of being capable of operating for many charge cycles without significant loss of performance. However, such batteries have a low energy to weight ratio. Similar limitations are found in most other systems, such as Ni-Cd and nickel metal hydride systems.

Among the factors leading to the successful development of high specific to energy batteries, is the fundamental need for high cell voltage and low equivalent weight electrode materials. Electrode materials must also fulfill the basic electrochemical requirements of sufficient electronic and ionic conductivity, high reversibility of the oxidation/reduction reaction, as well as excellent thermal and chemical stability within the temperature range for a particular application. Importantly, the electrode materials must be reasonably inexpensive, widely available, non-toxic, and easy to process.

Thus, a smaller, lighter, cheaper, non-toxic battery is sought for the next generation of batteries. The low equivalent weight of lithium renders it attractive as a battery electrode component for improving weight ratios. Lithium provides also greater energy per volume than do the traditional battery standards, nickel and cadmium..

The low equivalent weight and low cost of sulfur and its nontoxicity renders it also an attractive candidate battery component. Successful lithium/organosulfur battery cells are known. [See, De Jonghe et al., U.S. Pat. Nos. 4,833,048 and 4,917,974; and Visco et al., U.S. Pat. No. 5,162,175.]

However, employing a positive electrode based on elemental sulfur in an alkali metal-sulfur battery system has been considered problematic. Although theoretically the reduction of sulfur to an alkali metal sulfide confers a large specific energy, sulfur is known to be an excellent insulator, and problems using it as an electrode have been noted. Such problems referred to by those in the art include the necessity of adjoining the sulfur to an inert electronic conductor, very low percentages of utilization of the bulk material, poor reversibility, and the formation of an insulating sulfur film on the carbon particles and current collector surface that electronically isolates the rest of the electrode components. [DeGott, P., "Polymere Carbone-Soufre Synthèse et Propriétés Electrochimiques," Doctoral Thesis at the Institut National Polytechnique de Grenoble (date of defense of thesis: 19 June 1986) at page 117.]

Similarly, Rauh et al., "A Lithium/Dissolved Sulfur Battery with an Organic Electrolyte," *J. Electrochem. Soc.*, 126 (4): 523 (April 1979) state at page 523: "Both $S_8$ and its ultimate discharge product, $Li_2S$, are electrical insulators. Thus it is likely that insulation of the positive electrode material . . . led to the poor results for Li/S cells."

Further, Peramunage and Licht, "A Solid Sulfur Cathode for Aqueous Batteries," *Science*, 261:1029 (20 August 1993) state at page 1030: "At low (room) temperatures, elemental sulfur is a highly insoluble, insulating solid and is not expected to be a useful positive electrode material." However, Peramunage and Licht found that interfacing sulfur with an aqueous sulfur-saturated polysulfide solution converts it from an insulator to an ionic conductor.

The use of sulfur and/or polysulfide electrodes in non-aqueous or aqueous liquid-electrolyte lithium batteries (that is, in liquid formats) is known. For example, Peled and Yamin, U.S. Pat. No. 4,410,609, describe the use of a polysulfide positive electrode $Li_2S_x$ made by the direct reaction of Li and S in tetrahydrofuran (THF). Poor cycling efficiency typically occurs in such a cell because of the use of a liquid electrolyte with lithium metal foil, and the Peled and Yamin patent describes the system for primary batteries. Rauh et al., "Rechargeable Lithium-Sulfur Battery (Extended Abstract), *J. Power Sources*, 26:269 (1989) also notes the poor cycling efficiency of such cells and states at page 270 that "most cells failed as a result of lithium depletion."

Other references to lithium-sulfur battery systems in liquid formats include the following: Yamin et al., "Lithium Sulfur Battery," *J. Electrochem. Soc.*, 135(5): 1045 (May 1988); Yamin and Peled, "Electrochemistry of a Nonaqueous Lithium/Sulfur Cell," *J. Power Sources*, 9:281 (1983); Peled et al., "Lithium-Sulfur Battery: Evaluation of Dioxolane-Based Electrolytes," *J. Electrochem. Soc.*, 136(6): 1621 (June 1989); Bennett et al., U.S. Pat. No. 4,469,761; Farrington and Roth, U.S. Pat. No. 3,953,231; Nole and Moss, U.S. Pat. No. 3,532,543; Lauck, H., U.S. Pat. Nos. 3,915,743 and 3,907,591; Societe des Accumulateurs Fixes et de Traction, "Lithium-sulfur battery," *Chem. Abstracts*, 66: Abstract No. 111055d at page 10360 (1967); and Lauck, H. "Electric storage battery with negative lithium electrode and positive sulfur electrode," *Chem. Abstracts,* 80: Abstract No. 9855 at pages 466–467 (1974).]

DeGott, supra, notes at page 118 that alkali metal-sulfur battery systems have been studied in different formats, and then presents the problems with each of the studied formats. For example, he notes that an "all liquid" system had been rapidly abandoned for a number of reasons including among others, problems of corrosiveness of liquid lithium and sulfur, of lithium dissolving into the electrolyte provoking self-discharge of the system, and that lithium sulfide forming in the positive (electrode) reacts with the sulfur to give polysulfides $Li_2S_x$ that are soluble in the electrolyte.

In regard to alkali metal-sulfur systems wherein the electrodes are molten or dissolved, and the electrolyte is solid, which function in exemplary temperature ranges of 130° C. to 180° C. and 300° C. to 350° C., DeGott states at page 118 that such batteries have problems, such as, progressive diminution of the cell's capacity, appearance of electronic conductivity in the electrolyte, and problems of safety and corrosion. DeGott then lists problems encountered with alkali metal-sulfur battery systems wherein the electrodes are solid and the electrolyte is an organic liquid, and by extension wherein the negative electrode is solid, the electrolyte is solid, and the positive electrode is liquid. Such problems include incomplete reduction of sulfur, mediocre reversibility, weak maximum specific power (performance limited to slow discharge regimes), destruction of the passivating layer of $Li_2S$ as a result of its reaction with dissolved sulfur leading to the formation of soluble polysulfides, and problems with the stability of the solvent in the presence of lithium.

DeGott also describes on page 117 a fundamental barrier to good reversibility as follows. As alkali metal sulfides are ionic conductors, they permit, to the degree that a current collector is adjacent to sulfur, the propagation of a reduction reaction. By contrast, their reoxidation leads to the formation of an insulating sulfur layer on the positive electrode that ionically insulates the rest of the composite, resulting in poor reversibility.

DeGott concludes on page 119 that it is clear that whatever format is adopted for an alkali metal-sulfur battery system that the insulating character of sulfur is a major obstacle that is difficult to overcome. He then describes preliminary electrochemical experiments with a composite electrode prepared by depositing on stainless steel by capillary action a layer from a composition consisting in percent by weight: sulfur (46%); acetylene black (16%) and $(PEO)_8 LiClO_4$ (38%; polyethylene oxide/lithium perchlorate). From those preliminary experiments, DeGott concludes on page 128 that it is clear that, even when optimizing the efficiency of the composite electrode (that is, by multiplying the triple point contacts) that elemental sulfur cannot be considered to constitute an electrode for a secondary battery, in an "all solid" format.

Present solid-state lithium secondary battery systems are limited to a specific energy of about 120 Wh/kg. It would be highly desirable to have a battery system characterized by higher specific energy values.

It would be even more desirable if solid-state batteries having practical specific energy values greater than about 150 Wh/kg could operate at room temperature. It would be additionally advantageous if solid-state batteries having high specific energy and operation at room temperature could be reliably fabricated into units with reproducible performance values.

In lithium cells wherein a liquid electrolyte is used, leakage of the electrolyte can leave lithium exposed to the air, where it rapidly reacts with water vapor and oxygen. Substantial casing can prevent such reactions and protect users and the environment from exposure to hazardous, corrosive, flammable or toxic solvents but adds unwanted weight to the battery. A solid-state battery would greatly reduce such problems of electrolyte leakage and exposure of lithium, and would allow reducing the weight of the battery.

Furthermore, a battery formulation that overcomes the problem of lithium depletion described in the prior art, for example, Rauh et al., supra, would have many advantages.

In summary, disadvantages in currently available metal-sulfur battery systems include poor cycling efficiency, poor reversibility, lithium depletion, or operating temperatures above 200° C., among other problems. Practitioners in the battery art have long sought a solid-state or gel-state metal-sulfur battery system that would overcome these limitations.

SUMMARY OF THE INVENTION

It is an object of this invention to provide a positive electrode for a battery cell that has low equivalent weight and high cell voltage and consequently a high specific energy, and operates in a wide range of temperatures including ambient and sub-ambient temperatures. An exemplary operating temperature range for the batteries of this invention is from −40° C. to 145° C. The batteries of this invention are preferably rechargeable. Thin film type battery cells are preferred embodiments.

The positive electrode of this invention comprise an active-sulfur-based material having a relatively low equivalent weight. Said electrode is a composite comprising, in the theoretically fully charged state, elemental sulfur, preferably an ionically conductive material, and an electronically conductive material. Upon discharge, the active sulfur of the positive electrode reacts with the metal of the negative electrode, and metal sulfides and polysulfides form. For example, where M is the metal of the negative electrode, the overall cell reaction can be described as follows:

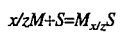
$$x/zM+S=M_{x/z}S$$

wherein M=any metal that can function as an active component in a negative electrode in a battery cell wherein active-sulfur is the active component of the positive electrode; x=0 through x=2; z=the valence of the metal; and S is sulfur.

M is preferably selected from the group consisting of alkali metals, alkaline earth metals, and transition metals. M is more preferably selected from the group consisting of alkali metals, and still more preferably lithium or sodium. M is most preferably lithium.

More specifically, for example, in a preferred embodiment of this invention wherein the negative electrode contains lithium, the overall cell reaction wherein z=1 can be described as follows:

$$xLi+S=Li_xS.$$

When x=2, 100% of the theoretical specific energy of the system has been released.

Upon discharge, the positive electrode becomes a combination of sulfur, metal sulfides and polysulfides, and during the discharging process the proportions of those sulfur-containing components will change according to the state of charge. The charge/discharge process in the positive electrode is reversible. Similarly, upon recharging, the percentages of the sulfur-containing ingredient will vary during the process.

The positive electrode is thus made from an electrode composition comprising active-sulfur, an electronically conductive material intermixed with the active-sulfur in a manor that permits electrons to move between the active-sulfur and the electronically conductive material, and an ionically conductive material intermixed with the active-sulfur in the manor that permits ions to move between the ionically conductive material and the sulfur.

The ionically conductive material of said composite positive electrode is preferably a polymeric electrolyte, more preferably a polyalkylene oxide, and further, preferably polyethylene oxide in which an appropriate salt may be added. Additional ionically conductive materials for use in the positive electrode include the components decribed in the solid-state and gel-state electrolyte separator.

Examples of electronically conductive materials of the composite positive electrode include carbon black, electronically conductive compounds with conjugated carbon-carbon and/or carbon-nitrogen double bonds, for example but not limited to, electronically conductive polymers, such as, polyaniline, polythiophene, polyacetylene, polypyrrole, and combinations of such electronically conductive materials. The electronically conductive materials of the positive electrode may also have electrocatalytic activity.

The composite sulfur-based positive electrode may further optionally comprise performance enhancing additives, such as, binders; electrocatalysts, for example, phthalocyanines, metallocenes, brilliant yellow [Reg. No. 3051-11-4 from Aldrich Catalog Handbook of Fine Chemicals; Aldrich Chemical Company, Inc., 1001 West Saint Paul Avenue, Milwaukee, Wis. 53233 (USA)] among other electrocatalysts; surfactants; dispersants (for example, to improve the homogeneity of the electrode's ingredients); and protective layer forming additives (for example, to protect a lithium negative electrode), such as, organosulfur compounds, phosphates, iodides, nitrides, and fluorides, for example LiI and HF.

The range of active-sulfur in such electrodes in the theoretically fully charged state is from 20% to 80% by weight. Said active-sulfur-based composite electrode is preferably processed such that the component particles are homogeneously distributed, and segregation and/or agglomeration of the component particles is avoided.

A metal-sulfur battery systems constructed with said active-sulfur-based composite positive electrode of this invention should have at least 5%, and more preferably at least 10% availability of the active-sulfur. That availability corresponds to a minimum of 168 mAh per gram of sulfur included in the positive electrode. This is based the theoretical value of 1675 mAh/gm of sulfur at 100% availability. Thus, between about 10% and about 100% of the active-sulfur is accessible to any charge carriers.

The electrolyte separator used in combination with the positive electrodes of this invention functions as a separator for the electrodes and as a transport medium for the metal ions. Any electronically insulating and ionically conductive material which is electrochemically stable may be used. For example, it has been shown that polymeric, glass and/or ceramic materials are appropriate as electrolyte separators, as well as other materials known to those of skill in the art, such as, porous membranes and composites of such materials. Preferably, however, the solid-state electrolyte separator is any suitable ceramic, glass, or polymer electrolyte such as, polyethers, polyimines, polythioethers, polyphosphazenes, polymer blends, and the like, in which an appropriate electrolyte salt may be added. In the solid-state, the electrolyte separator may contain an aprotic organic liquid wherein said liquid constitutes less than 20% (weight percentage) of the total weight of the electrolyte separator.

In the gel-state, the electrolyte separator contains at least 20% (weight percentage) of an aprotic organic liquid wherein the liquid is immobilized by the inclusion of a gelling agent. Any gelling agent, for example, polyacrylonitrile, PVDF, or PEO, can be used.

The liquid electrolyte for the liquid format batteries using the positive electrode of this invention, is also preferably an aprotic organic liquid. The liquid format battery cells constructed using the positive electrodes of this invention would preferably further comprise a separator which acts as an inert physical barrier within the liquid electrolyte. Exemplary of such separators include glass, plastic, ceramic, polymeric materials, and porous membranes thereof among other separators known to those in the art.

Solid-state and gel-state positive electrodes of this invention can be used in solid-state or liquid format batteries, depending on the specific format of the electrolyte separator and negative electrode. Regardless of the format of the batteries using the positive electrode of this invention, the negative electrode can comprise any metal, any mixture of metals, carbon or metal/carbon material capable of functioning as a negative electrode in combination with the active-sulfur-based composite positive electrode of this invention. Accordingly, negative electrodes comprising any of the alkali or alkaline earth metals or transition metals for example, (the polyether electrolytes are known to transport divalent ions such as $Zn^{++}$) in combination with the positive electrode of this invention are within the ambit of the invention, and particularly alloys containing lithium and/or sodium.

Preferred materials for said negative electrodes include Na, Li and mixtures of Na or Li with one or more additional alkali metals and/or alkaline earth metals. The surface of such negative electrodes can be modified to include a protective layer, such as that produced on the negative electrode by the action of additives, including organosulfur compounds, phosphates, iodides, nitrides, and fluorides, and/or an inert physical barrier conductive to the metal ions from the negative electrode, for example, lithium ions transport in lithium phosphate, or silicate glasses, or a combination of both.

Also preferred materials for said negative electrodes include carbon, carbon inserted with lithium or sodium, and mixtures of carbon with lithium or sodium Here, the negative electrode is preferably carbon, carbon inserted with lithium or sodium, and/or a mixture of carbon with lithium or sodium. When the negative electrode is carbon, the positive electrode is in the fully discharged state, comprising lithium or sodium sulfides and polysulfides. Particularly preferred negative electrodes for batteries are lithium inserted within highly disordered carbons, such as, poly p-phenylene based carbon, graphite intercalation compounds, and $Li_yC_6$ wherein y=0.3 to 2, for example, $LiC_6$, $Li_2C_6$ and $LiC_{12}$. When the negative electrode is carbon, the cells are preferably assembled with the positive electrode in the fully discharged state comprising lithium or sodium sulfides and/or polysulfides. The use of negative electrodes of the carbon, carbon inserted with lithium or sodium, and mixtures of carbon with lithium or sodium with the solid-state and gel-state positive electrodes of this invention are especially advantageous when the battery is in the liquid fount.

BRIEF DESCRIPTION OF THE DRAWINGS

FIG. 1 provides a schematic of a Li/electrolyte separator/ active-sulfur electrode cell of this invention.

FIG. 2 illustrates the reversible cycling performance of a lithium cell (Li/amorphous PEO/active-sulfur) of this invention evaluated at 30° C. at an active-sulfur capacity of 330 mAh/gm for each cycle.

FIG. 3 illustrates the availability of the active-sulfur in the positive electrode of a lithium cell (Li/amorphous PEO/active-sulfur) of this invention evaluated at 30° C.

FIG. 4 illustrates the availability of the active-sulfur in the positive electrode of a lithium cell (Li/gel-state electrolyte separator/active-sulfur) of this invention evaluated at 30° C.

FIG. 5 illustrates the availability of the active-sulfur in the positive electrode of a lithium cell (Li/PEO/active-sulfur) of this invention evaluated at 90° C.

FIG. 6 illustrates the reversible cycling performance of a lithium cell-(Li/PEO/active-sulfur) of this invention evaluated at 90° C. at an active-sulfur capacity of 400 mAh/gm for each cycle.

FIG. 7 illustrates the reversible cycling performance of a lithium cell (Li/PEO/active-sulfur) of this invention evaluated at 90° C.

FIG. 8 illustrates the peak power performance of a lithium cell (Li/PEO/active-sulfur) of this invention evaluated at 90° C.

Abbreviations aPEO—amorphous polyethylene oxide
cm—centimeter
DEC—diethyl carbonate
DMC—dimethyl carbonate
DME—dimethyl ether
EC—ethylene carbonate
E.W.—equivalent weight
F.W.—formula weight
GICs—graphite intercalation compounds
gm—gram
mAh—milliamperes per hour
mm—millimeter
MW—molecular weight
OCV—open circuit voltage
PC—propylene carbonate
P.E.D.—practical energy density
PEO—polyethylene oxide
PEG—polyethylene glycol
PPP—poly (p-phenylene)
psi—pounds per square inch
PVDF—polyvinylidene fluoride
T.E.D.—theoretical energy density
$\mu A$—microampere
$\mu m$—micrometer
WE—working electrode
W/kg—watts per kilogram
Wh/kg—watthours per kilogram
W/l—watts per liter
wt.—weight
V—volts Definitions "Metals" are defined herein to be elements whose atoms usually lose electrons in the formation of compounds.

The phrase "alkali metals" is herein defined as the alkali family of metals located in Group IA of the periodic table, including lithium (Li), sodium (Na), potassium (K), rubidium (Rb), cesium (Cs) and francium (Fr).

The phrase "alkaline earth family" is herein defined as the Group IIA elements, including beryllium (Be), magnesium (Mg), calcium (Ca), strontium (St), barium (Ba) and radium (Ra).

The phrase "transition metals" is defined herein to include the following metals:

(1) the scandium family: scandium (Sc), yttrium (Y), lanthanum (La) and the lanthanide series, and actinium (Ac) and the actinide series;

(2) the titanium family: titanium (Ti), zirconium (Zr), and hafnium (Hf);

(3) the vanadium family: vanadium (V), niobium (Nb), and tantalum (Ta);

(4) the chromium family: chromium (Cr), molybdenum (Mo), and tungsten (W);

(5) the manganese family: manganese (Mn), technetium (Tc), and rhenium (Re);

(6) the iron family: iron (Fe), cobalt (Co), and nickel (Ni);

(7) the platinum family: ruthenium (Ru), rhodium (Rh), palladium (Pd), osmium (Os), iridium (Ir), and platinum (Pt);

(8) the copper family: copper (Cu), silver (Ag), and gold (Au);

(9) the zinc family: zinc (Zn), cadmium (Cd), and mercury (Hg);

(10) the aluminum family: aluminum (Al), gallium (Ga), indium (In), and thallium (Tl); and

(11) the germanium family: germanium (Ge), tin (Sn), and lead (Pb).

The term "active-sulfur" is defined herein to be elemental sulfur or sulfur that would be elemental if the positive electrode were in its theoretically fully charged state.

The term "solid-state" is defined herein to be a material which contains less than 20% by weight of a liquid.

The term "gel-state" is defined herein to be a material containing at least 20% by weight of a liquid wherein said liquid is immobilized by the presence of a gelling agent.

The term "component" is defined herein to be (a) positive electrode, (b) electrolyte separator, or (c) negative electrode.

DETAILED DESCRIPTION

The instant invention provides a positive electrode for solid-state and liquid format battery systems, wherein the positive electrode is based on active-sulfur, which provides high specific energy and power, exceeding that of highly developed systems now known and in use. Solid-state format battery cell means all the components of the battery are either solid-state or gel-state. It further means that no component is in a liquid state. The equivalent weight of the active-sulfur used in the redox reactions within the battery cells of this invention is 16 grams/equivalent (with a lithium metal as the negative electrode, active-sulfur in its theoretically fully discharged state is $Li_2S$), leading to a theoretical specific energy of 2800 watthours per kilogram [Wh/kg] for a lithium cell having a average OCV of 2.4 volts. Such an exceedingly high specific energy is very unusual and highly attractive.

Further, the batteries containing the positive electrode of this invention can operate at room temperature. The battery systems of this invention provide energy to weight ratios far in excess of the present demands for load leveling and/or electric vehicle applications, and can be reliably fabricated into units with reproducible performance values.

This invention can be incorporated in a battery cell which includes solid-state or gel-electrolyte separators. This embodiment excludes the problem of a battery cell in the liquid format that may suffer electrolyte leakage. For example, in lithium cells wherein a liquid electrolyte is used, leakage of the electrolyte can leave lithium exposed to the air, where it rapidly reacts with water vapor. Substantive casing can prevent such reactions and protects users and the environment from exposure to solvents but adds unwanted weight to the battery. Using a solid-state or gel-state format battery cells greatly reduces such problems of electrolyte leakage and exposure of lithium, and can cut down on the weight of the battery.

Another embodiment concerns battery cells in a liquid format, which have a solid active-sulfur-based positive electrode of this invention, and which have a solid negative electrode that contains carbon (when in the fully discharged state), carbon inserted with lithium or sodium and/or a mixture of carbon with lithium or sodium. Such an embodiment can overcome the problem of lithium depletion described in the prior art, for example, Rauh et al., supra.

In accordance with this invention, the active-sulfur-based composite positive electrode and a battery system constructed with said positive electrode are provided. The positive electrodes of this invention are preferably reversible, and the metal-active-sulfur battery cells are preferably secondary batteries, and more preferably thin film secondary batteries.

The invention relates in one aspect to the positive electrode of battery cells wherein both the positive and negative electrodes are solid-state or gel-state and the electrolyte separator is either a solid-state or a gel-state material (see Definition). In another aspect, as indicated above, the positive electrode of this invention is used in a battery cell which contains a liquid electrolyte wherein the negative electrode is solid or gel-state and contains carbon, carbon inserted with lithium or sodium, or mixtures of carbon with lithium or sodium. However, whatever the format of the battery cells made with the positive electrodes of this invention, said positive electrode comprises elemental sulfur as the active component when in the theoretically fully charged state.

Positive Electrode

The active-sulfur of the novel positive electrodes of this invention is preferably uniformly dispersed in a composite matrix, for example, the active-sulfur can be mixed with a polymer electrolyte (ionically conductive), preferably a polyalkylene oxide, such as polyethylene oxide (PEO) in which an appropriate salt may be added, and an electronically conductive material. Furthermore, the ionically conductive material may be either solid-state or gel-state format. In most cases it will be necessary or desirable to include a suitable polymeric electrolyte, for rapid ion transport within the electrode as is done with intercalation materials based electrodes. In a preferred embodiment, the ionically conducting material is polyethylene oxide or amorphous polyethylene oxide complexed with lithium trifluoromethanesulfonimide and having a concentration of between about 1:8 and about 1:49 molecules of salt per monomer unit. Furthermore, because the active-sulfur is not electrically conductive, it is important to disperse some amount of an electronically conductive material in the composite electrode.

Preferred weight percentages of the major components of the active-sulfur-based positive electrodes of this invention in a theoretically fully charged state are: from 20% to 80% active-sulfur; from 15% to 75% of the ionically conductive material (which may be gel-state or solid-state), such as PEO with salt, and from 5% to 40% of an electronically conductive material, such as carbon black, electronically conductive polymer, such as polyaniline. More preferably, those percentages are: from 30% to 75% of active-sulfur; from 15% to 60% of the ionically conductive material; and from 10% to 30% of the electronically conductive material. Even more preferable percentages are: from 40% to 60% of active-sulfur; from 25% to 45% of the ionically conductive material; and from 15% to 25% of the electronically conductive material. Another preferred percentage by weight range for the electronically conductive material is from 16% to 24%.

Methods of Making a Positive Electrode:

The positive electrode of this invention can be prepared for each of the battery formats by a combination of generally known processes. For example, for a solid-state format, the active-sulfur material, polyethylene oxide (PEO) and carbon black can be dissolved or dispersed in acetonitrile using PEG dispersant, and subsequently the solvent can be evaporated to east a thin film (for example, from 10 to 200 microns) of a solid composite electrode on a surface. In a preferred embodiment, the positive electrode is composed of active-sulfur, PEO (conventional or amorphous) and carbon black.

The ionic conductors in the positive electrode of this invention can be any of the solid-state or gel-state electrolytes described in the Electrolyte Separators and Liquid Electrolytes section but are not limited to those described in that section.

The composite electrode of this invention is preferably prepared such that homogeneity of the product is obtained. Segregation of the components is preferably avoided. For example, in processing the positive electrodes of this invention, it is generally advisable to prevent segregation of the active-sulfur to the current collector electrode interface. The processing should render the sulfur generally available and at least 10% available. Also avoided is agglomeration of any component particles or grains. Thus, relatively uniform distribution of the components is preferably sought.

The metal-sulfur battery systems constructed with said active-sulfur based composite positive electrode of this invention should have at least 5%, and more preferably at least 10% at availability of the active-sulfur. That availability corresponds to a minimum of 84 mAh per gram of active-sulfur included in the positive electrode. This is based the theoretical value of 1675 mAh/gm of sulfur as 100% availability.

Positive electrode films can be made by mixing 45%–55% (percentage by weight) elemental sulfur, 8–24% carbon black, and the balance includes but is not limited to ionic conductors such as amorphous polyethylene oxide (aPEO: oxymethylene-linked polyethylene oxide) or polyethylene oxide (PEO) based electrolytes. The ionic conductors can also contain added anhydrous electrolyte salts such as lithium trifluoromethanesulfonimide or lithium perchlorate. All the components are added to a solvent such as acetonitrile. The solvent to ionic conductor ratio can is typically from 40–200 ml per gram of the ionic conductor.

The components are stir-mixed for approximately two days until the slurry appears well mixed and uniform. This positive electrode slurry is cast directly and immediately onto stainless steel current collectors, and the solvent is allowed to evaporate at ambient temperatures. Alternatively, the electrode film can be cast on a release film surface and then transferred from such surface to an electrical connector on a current collector. Conventional electrical connectors such as carbon or aluminum powders or fibers or mesh may be used. A typical resulting positive electrode film weight ranged from approximately 0.0016 gm per $cm^2$ through 0.0120 gm per $cm^2$.

Uniformity of mixing can be achieved by methods known to those skilled in the art, for example, by prolonged slurry mixing, shear mixing, ball milling or vibromilling of the slurry, and cryogenic milling of the frozen slurry. The homogeneous slurries thus obtained should be preferably used immediately in subsequent electrode forming processes to minimize segregation or agglomeration of any of the components. The solvent, water, or liquid traces may be removed from the positive electrode slurry by exposing an electrode slurry film to a vacuum either with or without the application of the heat. The components of the resulting electrode will be uniformly distributed such that each component's concentration does not differ by more than 25% in a sample volume defined by the thin film thickness cubed.

Electrolyte Separators and Liquid Electrolytes

The electrolyte separator for solid-state format battery cells incorporating the positive electrode of this invention functions as a separator for the positive and negative electrodes and as a transport medium for the metal ions. As defined above, the material for such an electrolyte separator is preferably electronically insulating, ionically conductive and electrochemically stable.

When the battery cell is in a solid-state format, all components are either solid-state or gel-state and no component is in the liquid state.

The aprotic organic liquids used in the electrolyte separators of this invention, as well as in the liquid electrolytes of this invention, are preferably of relatively low molecular weight, for example, less than 50,000 MW. Combinations of aprotic organic liquids may be used for the electrolyte separators and liquid electrolytes of the battery cells incorporating the positive electrode of this invention.

Preferred aprotic organic liquids of the battery cells incorporating the positive electrode of this invention include among other related aprotic organic liquids, sulfolane, dimethyl sulfone, dialkyl carbonates, tetrahydrofuran (THF), dioxolane, propylene carbonate (PC), ethylene carbonate (EC), dimethyl carbonate (DMC), butyrolactone, N-methylpyrrolidinone, tetramethylurea, glymes, ethers, crown ethers, dimethoxyethane (DME), and combinations of such liquids.

For the battery cells, incorporating the positive electrode of this invention, containing a liquid electrolyte wherein the negative electrode is carbon-containing, said liquid is also an aprotic organic liquid as described above. Such a format also preferably contains a separator within the liquid electrolyte as discussed above.

An exemplary solid-state electrolyte separator combined with this invention is a ceramic or glass electrolyte separator which contains essentially no liquid. Polymeric electrolytes, porous membranes, or combinations thereof are exemplary of the type of electrolyte separator to which an aprotic organic plasticizer liquid could be added according to this invention for the formation of a solid-state electrolyte separator containing less than 20% liquid.

Preferably the solid-state electrolyte separator is a solid ceramic or glass electrolyte and/or solid polymer electrolyte. Said solid-state ceramic electrolyte separator preferably comprises a beta alumina-type material, Nasicon or Lisicon glass or ceramic. The solid-state electrolyte separator may include sodium beta alumina or any suitable polymeric electrolyte, such as polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

Exemplary but optional electrolyte salts for the battery cells incorporating the positive electrode of this invention include, for example, lithium trifluoromethanesulfonimide [$LiN(CF_3SO_2)_2$], lithium triflate ($LiCF_3SO_3$), lithium perchlorate ($LiClO_4$), $LiPF_6$, $LiBF_4$, $LiAsF_6$, as well as, corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

Negative electrode

For solid-state battery cells incorporating the positive electrode of this invention, the negative electrode may comprise any metal, any mixture of metals, any carbon or metal/carbon material capable of functioning as an active component of a negative electrode in combination with said sulfur positive electrode. For example, any of the alkali or alkaline earth metals or transition metals can be used, and particularly mixtures containing lithium and/or sodium.

Preferred materials for said negative electrode for the solid-state battery cell formats include sodium and/or lithium, and mixtures of sodium or lithium with one or more additional alkali metals and/or alkaline earth metals. Preferred materials for said negative electrode also include mixtures of sodium or lithium with one or more elements to form a binary or ternary alloy, such as, $Na_4Pb$, lithium-silicon and lithium-aluminum alloys.

A particularly preferred metal for a negative electrode is sodium, or at least a sodium base alloy (i.e., at least 90% by weight sodium) because of its low cost, low equivalent weight and its relatively low melting point of 97.8° C. However, other alkali metals such as Li or K, or mixtures of same with Na may also be used, as desired, to optimize the overall system.

Also preferred negative electrode materials for the solid-state battery cells incorporating the positive electrode of this invention include carbon, carbon inserted with lithium or sodium and/or a mixture of carbon with sodium or lithium. Exemplary and preferred are $Li_yC_6$ (wherein y=0.3 to 2), such as, $LiC_6$, negative electrodes which comprise graphite or petroleum coke, for example, graphite intercalation compounds (GICs), and carbon inserted within highly disordered carbons. The inserted carbon may also be that wherein some carbon has been alloyed with boron, or wherein the carbon has been prepared from low temperature pyrolysis (about 750° C.) of carbon or carbon-silicon containing polymers such that the carbon product retains some hydrogen or silicon or both. [See, Sato et al., "A Mechanism of Lithium Storage in Disordered Carbons," *Science*, 264:556 (22 April 1994), which discusses very good results with a preferred negative electrode of Li inserted within poly p-phenylene-based (PPP-based) carbon.]

For battery cells using the positive electrode of this invention that are in liquid formats, the negative electrode is carbon, carbon inserted with lithium or sodium, or mixtures of carbon and lithium or sodium as described above in relation to solid-state formats, including the preferable versions of such carbon-containing electrodes. For whatever format, if the negative electrode contains only carbon, the cell is in the theoretically fully discharged state, and the positive electrode comprises lithium or sodium sulfides or polysulfides.

Battery Cells

The battery cells containing the sulfur-based composite positive electrodes of this invention can be constructed according to conventional formats as described in the literature. For example, De Jonghe et al., U.S. Pat. No. 4,833,048 and Visco et al., U.S. Pat. No. 5,162,175. Such conventional formats are understood to be herein incorporated by reference.

The novel battery cells incorporating this invention, preferably secondary cells, more preferably thin film secondary cells, my be constructed by any of the well-known and conventional methods in the art. The negative electrode may be spaced from the positive sulfur electrode, and both electrodes may be in material contact with an ionically conductive electrolyte separator. Current collectors contact both the positive and negative electrodes in a conventional manner and permit an electrical current to be drawn by an external circuit.

Suitable battery constructions may be made according to the known art for assembling cell components and cells as desired, and any of the known configurations may be fabricated utilizing the invention. The exact structures will depend primarily upon the intended use of the battery unit.

A general scheme for the novel battery cells of this invention in a solid-state format may include a current collector in contact with the negative electrode and a current collector in contact with the positive electrode, and a solid-state electrolyte separator sandwiched between the negative and positive electrodes. In a typical cell, all of the components will be enclosed in an appropriate casing, for example, plastic, with only the current collectors extending beyond the casing. Thereby, reactive elements, such as sodium or lithium in the negative electrode, as well as other cell elements are protected.

The current collectors can be sheets of conductive material, such as, aluminum or stainless steel, which remain substantially unchanged during discharge and charge of the cell, and which provide current connections to the positive and negative electrodes of the cell. The positive electrode film may be attached to the current collector by directly casting onto the current collector or by pressing the electrode film onto the current collector. Positive electrode mixtures cast directly onto current collectors preferably have good adhesion. Positive electrode films can also be cast or pressed onto expanded metal sheets. Alternately, metal leads can be attached to the positive electrode film by crimp-sealing, metal spraying, sputtering or other techiques known to those skilled in the art. The sulfur-based positive electrode can be pressed together with the electrolyte separator sandwiched between the electrodes. In order to provide good electrical conductivity between the positive electrode and a metal container, an electronically conductive matrix of, for example, carbon or aluminum powders or fibers or metal mesh may be used. Further,as is conventional in the art, such materials can be used as electrical connectors between the positive electrode film and the current collector.

A particularly preferred battery cell comprises a solid lithium or sodium electrode, a polymeric electrolyte separator, either solid-state or gel, preferably a polyalkylene oxide, such as, polyethylene oxide, and a thin-film composite positive electrode containing an elemental sulfur electrode (that is hi the theoretically fully charged state), and carbon black, dispersed in a polymeric electrolyte. Optionally the electrolyte separator in such a preferred battery call can comprise an electrolyte salt.

Operating Temperatures

The operating temperature of the battery cells incorporating the novel positive electrode of this invention is preferably 180° C. or below. Preferred operating temperature ranges depend upon the application. Exemplary preferred operating temperature ranges include from −40° C. to 145° C.; from −20° C. to 145° C.; from −20° C. to 120° C.; and from 0° C. to 90° C. Most preferably for many applications, the cells incorporating this invention operate at ambient or above-ambient temperatures.

Different embodiments of this invention can provide different preferred operating temperature ranges. The choice of electrolyte can influence the preferred operating temperature ranges for the batteries incorporating the positive electrode of this invention. For example, when conventional PEO is used the preferred operating range is 60° C.; whereas when amorphous PEO (aPEO) is used, the battery can be run at room temperature, or in a range of 0° C. to 60° C.

Gel formats also provide for lower operating temperature ranges. Exemplary battery cells using the positive electrode of this invention containing, for example, polymeric electrolyte separators with increasingly greater percentage of a aprotic organic liquid immobilized by the presence of a gelling agent, can provide for increasingly lower operating temperature ranges. An exemplary operating temperature range for a solid-state battery having gel-state components of this invention would be from about −20° C. to about 60° C.

A battery with a liquid separator and an negative electrode comprising carbon, inserted carbon and/or a mixture of carbon and lithium or sodium can operate at a preferred temperature range of from −40° C. to 60° C.

The high temperature operating range of the battery cells based on the positive electrode of this invention can be limited by the melting point of either a solid electrode or a solid electrolyte. Thus sodium negative electrodes are limited to temperatures below 97.8° C., but sodium ahoy electrodes, such as $Na_4Pb$, can be used in a solid form at well over 100° C.

Specific Energy

The practical specific energies of the secondary cells utilizing this invention are preferably greater than 65 watt-hours per kilogram (Wh/kg), more preferably greater than 100 Wh/kg, still more preferably greater than 150 Wh/kg, even more preferably greater than 200 Wh/kg, still even more preferably greater than 250 Wk/kg and even more preferably greater than 850 Wh/kg. A preferred practical specific energy range of the batteries incorporating this invention is from about 100 Wh/kg to about 800 Wh/kg.

Cells made with lithium negative electrodes, solid-state or gel-state electrolyte separators, and positive electrodes made with sulfur, polyethylene oxide (or modified polyethylene oxide) and carbon particles were constructed to test the performance of the batteries of this invention. Examples of these tests will serve to further illustrate the invention but are not meant to limit the scope of the invention in any way.

EXAMPLE 1

Solid-state cell: Cycling performance at an active-sulfur capacity of 330 mAh/gm for each recharge cycle evaluated at 30° C.

A positive electrode film was made by mixing 45% (percentage by weight) elemental sulfur, 16% carbon black, amorphous polyethylene oxide (aPEO) and lithium trifluoromethanesulfonimide [wherein the concentration of PEO monomer units ($CH_2CH_2O$) per molecule of salt was 49:1], and 5% 2,5-dimercapto- 1,3,4-dithiadiazole in a solution of acetonitrile (the solvent to PEO ratio being 60:1 by weight). The components were stir-mixed for approximately two days until the slurry was well mixed and uniform. A thin positive electrode film was cast directly onto stainless steel current collectors, and the solvent was allowed to evaporate at ambient temperatures. The resulting positive electrode film weighed approximately 0.0028 gm per $cm^2$.

The polymeric electrolyte separator was made by mixing aPEO with lithium trifluoromethanesulfonimide, [the concentration of the electrolyte salt to PEO monomer units ($CH_2CH_2O$) per molecule of salt being 39:1] in a solution of acetonitrile (the solvent to polyethylene oxide ratio being 15:1 by weight). The components were stir-mixed for two hours until the solution was uniform. Measured amounts of the separator slurry were cast into a retainer onto a release film, and the solvent was allowed to evaporate at ambient temperatures. The resulting electrolyte separator film weighed approximately 0.0144 gm per $cm^2$.

The positive electrode film and polymeric electrolyte separator were assembled under ambient conditions, and then vacuum dried overnight to remove moisture prior to being transferred into the argon glovebox for final cell assembly with a 3 rail (75 micron) thick lithium anode film [FMC/Lithco, 449 North Cox Road, Box 3925 Gastonia, N.C. 28054 (USA)].

A schematic of the cell layers are shown in FIG. 1. Once assembled, the cell was compressed at 2 psi and heated at 40° C. for approximately 6 hours. After heating the layers of lithium, electrolyte separator, and the positive electrode were well adhered.

The cell was then evaluated with a battery tester [Maccor Inc., 2805 West 40th Street, Tulsa, Okla. 74107 (USA)] inside the glovebox at 30° C. That procedure was performed to eliminate any contamination problems of the lithium.

The cell was cycled to a constant capacity corresponding to delivering 330 mAh per gram of the active-sulfur in the positive electrode film. The rates used were 100–20 $\mu A/cm^2$ for discharging and 50–10 $\mu A/cm^2$ for charging to cutoff voltages of 1.8 and 3.0 volts, respectively.

FIG. 2 shows the end of the discharge voltage of the cell after each recharge cycle. As evident from the graph, the cell performance is very consistent.

EXAMPLE 2

Solid-state cell: Total discharge capacity to 900 mAh/gm of active-sulfur evaluated at 30° C.

A cell identical to the one described in Example 1 was discharged to 1.8 volts at current densities of 100–20 $\mu A/cm^2$ at 30° C. to determine the total availability of the active-sulfur in the film. The resulting discharge curve is seen in FIG. 3. The total capacity delivered by this film was in excess of 900 mAh per gram of the active-sulfur, that is, a utilization of 54% of the available active-sulfur, wherein 100% would be 1675 mAh/gm.

EXAMPLE 3

Solid-state cell having gel-state components: Total discharge capacity to 900 mAh/gm of active-sulfur evaluated at 30° C.

A positive electrode film similar to the one described in Example 1 was made with a composition of 50% (percentage by weight) elemental sulfur, 16% carbon black, amorphous polyethylene oxide (aPEO) and lithium trifluoromethanesulfonimide (at a 49:1 concentration).

The electrolyte separator used was a gel made inside the glovebox to avoid moisture and oxygen contamination. A starting solution consisting of 10% (weight percentage) of lithium trifluoromethanesulfonimide and 90% of tetraethylene glycol dimethylether (tetraglyme) was made. Then a solvent of 90% tetrahydrofuran (THF) was mixed with 10% of the starting solution. 5.6% Kynar Flex 2801 [Elf Atochem of North America, Inc., Fluoropolymers Department, 2000 Market Street, Philadelphia, Pa. 19103 (USA)], (hexafluoropropylene-vinylidene fluoride copolymer), a gelling agent, was added to the mixture.

The mixture was stirred for a few minutes and then left standing for 24 hours so that the components were absorbed into the hexafluoropropylene-vinylidene fluoride copolymer. The mixture was stirred again for a few minutes to homogenize the components and then heated for 1 hour at 60° C. Electrolyte separator films were cast onto a release film, and the THF solvent was allowed to evaporate at ambient temperatures. The resulting electrolyte separator film weighed approximately 0.0160 gm per $cm^2$.

The resulting cell comprising the positive electrode film, the gel-state electrolyte separator film, and the lithium negative electrode was tested at the same conditions as the cell described in Example 2. The total capacity delivered by this film was also in excess of 900 mAh per gram of the active-sulfur, that is, a utilization of 54% of the available sulfur, wherein 100% would be 1675 mAh/gm.

EXAMPLE 4

Solid-state cell: Total discharge capacity to 1500 mAh/gm of sulfur evaluated at 90° C.

A positive electrode film similar to the one described in Example 1 was made for use at above ambient temperatures with a composition of 50% (weight percentage) elemental sulfur, 16% carbon black, polyethylene oxide (900,000 molecular weight) and lithium trifluoromethane-sulfonimide (a 49:1 concentration).

The solid-state electrolyte separator used was cast from a slurry of 900,000 MW PEO in acetonitrile without any additional electrolyte salts. The resulting electrolyte separator film weighed approximately 0.0048 gm per $cm^2$.

The cell was assembled as described in Example 1. Once assembled, the cell was compressed at 2 psi and heated at 90° C. for approximately 6 hours. The cell was tested at 90° C. inside a convection oven located in the glovebox. The cell was discharged to 1.8 V at rates of 500 to 100 $\mu A/cm^2$.

The capacity relative to the sulfur versus the voltage during discharge is shown in FIG. 5. The total capacity delivered by this film was also in excess of 1500 mAh per gram of the sulfur, that is, a utilization of 90% of the available sulfur, wherein would be 1675 mAh/gm of the sulfur.

EXAMPLE 5

Solid-state cell: Cycling performance at a sulfur capacity of 400 mAh/gm for each cycle evaluated at 90° C.

A positive electrode film similar to the one described in Example 4 was made with a composition of 50% (weight percentage) elemental sulfur, 24% carbon black, polyethylene oxide (900,000 molecular weight) and lithium trifluoromethanesulfonimide (a 49:1 concentration). The electrolyte separator is also the same as described in Example 4. The cell was tested at 90° C. and cycled to a constant capacity corresponding to delivering 400 mAh/gm of the sulfur in the positive electrode film. The rate used was 500 µA/cm² for discharge to 1000–500 µA/cm² for charging at cutoff voltages of 1.8 and 2.6 volts, respectively.

FIG. 6 shows the end of the discharge voltage of the cell after each recharge cycle. As evident from the graph, the cell performance is very consistent.

EXAMPLE 6

Solid-state cell: Cycling performance for each cycle to a cutoff voltage of 1.8 V evaluated at 90° C.

A positive electrode film identical to the one described in Example 4 was made. The electrolyte separator is also the same as described hi Example 4. The cell was tested at 90° C. and cycled between voltage limits between 1.8–2.6 volts. The rates used were 500–100 µA/cm² for charging. FIG. 7 shows the delivered capacity after each recharge. As evident from this graph most recharge cycles delivered above 1000 mAh per gram of the sulfur used in the cathode film.

EXAMPLE 7

Solid-state cell: Peak power performance evaluated at 90° C.

A positive electrode film similar to the one described in Example 4 was made with a composition of 50% (weight percentage) elemental sulfur, 16% carbon black, polyethylene oxide (900,000 molecular weight) and lithium trifluoromethanesulfonimide (a 49:1 concentration). The electrolyte separator is also the same as described in Example 4. The cell was tested at 90° C. and pulse discharged for a 30 second duration or to a cutoff voltage of 1.2 V. The discharge rates ranged from 0.1–3.5 mA/cm². The pulse power (W/kg) delivered by the cathode film versus the current density is shown in FIG. 8. As seen from the plot, an extraordinarily high pulse power of 3000 W/kg is capable of being attained.

The following table summarizes the performance of the representative battery cells of Examples 1–7 under the specific testing conditions detailed in each example.

The following table summarizes the performance of the battery under the specific testing conditions detailed in examples 1–7.

for the laboratory tests were not optimized for the final battery. The battery projections are based on using 5 µm thick polymeric electrolyte separators, 30 µm thick lithium foil and 2.5–5.0 µm thick current collectors. Additionally, there is a 10% weight increase allocated for the external casing assuming for batteries larger than I Amphour.

Depending on the exact size and configuration of the cell laminate, the finished battery performance is approximately 30–70% of the positive electrode film performance. For simplicity, 50% has been used for the conversion between positive electrode performance and battery projections (this is equivalent to 100% battery burden). The calculated density range of the battery ranged from 1.0–1.6 gm/cm³ depending on the specific components and configurations. For simplicity, a density of 1.3 gm/cm³ is used to calculate the projected energy density (Wh/l).

As evident from the table, the battery systems containing the positive electrode of this invention demonstrate exceptionally high specific energies and exceed all now known solid-state intercalation compound-based batteries. The cells of this invention also out perform cells which operate at much higher temperatures such as the Na/beta-alumina/ $Na_2S_x$ cell (350° C.), LiAl/LiCl, KCl/$FeS_2$ cell (450° C.).

It is seen that the invention provides high specific energy and power cells, the performance of which exceeds that of highly developed systems now known and in use. At the same time, the high energy and power are available at room temperature or ambient operation.

The foregoing describes the instant invention and its presently preferred embodiments. Numerous modifications and variations in the practice of this invention are expected to occur to those skilled in the art. Such modifications and variations are encompassed within the following claims.

All references cited herein are incorporated by reference.

I claim:
1. A positive electrode comprising,
   a) active-sulfur;
   b) an electronically conductive material mixed with the sulfur so that electrons can move between the sulfur and the electronically conductive material; and
   c) an ionically conductive material mixed with the active-sulfur so that ions can move between the ionically conductive material and the sulfur, wherein at least about 10% of the active-sulfur is accessible to electrons and ionic charge carriers.
2. The positive electrode of claim 1 wherein the positive electrode is electrically connected to a current collector.

|   | Temp, Type | Result based on Cathode Film Performance* | # Cycles | Battery Projections** | Battery Projections** | Battery Projections** |
|---|---|---|---|---|---|---|
| 1 | 30° C., solid-state | 880 Wh/kg | N.A. | 440 Wh/kg | 550 Wh/l | 440 Wh/kg |
| 2 | 30° C., solid-state | 300 Wh/kg | 50+ | 150 Wh/kg | 190 Wh/l | 150 Wh/kg |
| 3 | 30° C., gel-state component | 980 Wh/kg | N.A. | 490 Wh/kg | 610 Wh/l | 490 Wh/kg |
| 4 | 90° C., solid-state | 1500 Wh/kg | N.A. | 630 Wh/kg | 790 Wh/l | 630 Wh/kg |
| 5 | 90° C., solid-state | 400 Wh/kg | 30+ | 200 Wh/kg | 250 Wh/l | 200 Wh/kg |
| 6 | 90° C., solid-state | 1000 Wh/kg | ~10 | 500 Wh/kg | 630 Wh/l | 500 Wh/kg |
| 7 | 90° C., solid-state | max: 3000 W/kg | N.A. | 1500 Wh/kg | 1880 Wh/l | 1500 Wh/kg |

*Mean voltage 2.0 V.
**Assumed battery burden of 100%

The demonstrated specific energies and specific powers listed above are based on the entire composite positive electrode. The electrolyte separators and lithium foils used 3. The positive electrode of claim 2 wherein the electrode is operated between about −40 degrees Celsius and about 180 degrees Celsius.

4. The positive electrode of claim 3 wherein the electrode is operated between about 30 degrees Celsius and about 90 degrees Celsius.

5. The positive electrode of claim 2 wherein the electrode is deposited directly on the current collector as a thin film electrode having a thickness, t.

6. The positive electrode of claim 5 wherein components of the positive electrode are uniformly distributed such that each component's concentration does not differ by more than 25% in a sample volume defined by half the thin film thickness cubed.

7. The positive electrode of claim 1 wherein the positive electrode contains, between about 20% by weight to about 80% by weight, active-sulfur.

8. The positive electrode of claim 7 wherein the positive electrode contains, between about 30% by weight to about 75% by weight, active-sulfur.

9. The positive electrode of claim 8 wherein the positive electrode contains, between about 40% by weight to about 60% by weight, active-sulfur.

10. The positive electrode of claim 9 wherein the positive electrode contains, between about 45% by weight to about 55% by weight, active-sulfur.

11. The positive electrode of claim 1 wherein the electronically conductive material is selected from the group consisting of carbon black, compounds with conjugated carbon-carbon or carbon-nitrogen double bonds, electronically conductive polymers, polyaniline compounds, polythiophene compounds, polyacteylene compounds, polypyrrole compounds, and combinations thereof.

12. The positive electrode of claim 1 wherein the positive electrode contains, between about 5% by weight to about 40% by weight, electronically conductive material.

13. The positive electrode of claim 12 wherein the positive electrode contains, between about 8% by weight to about 30% by weight, electronically conductive material.

14. The positive electrode of claim 13 wherein the positive electrode contains, between about 8% by weight to about 24% by weight, electronically conductive material.

15. The positive electrode of claim 1 wherein the ionically conductive material of the positive electrode is provided in a solid-state form.

16. The positive electrode of claim 15 wherein the the ionically conductive material is selected from the group consisting of polymeric electrolytes, ceramic electrolytes, glass electrolytes, beta alumina compounds, and combinations thereof.

17. The positive electrode of claim 16 wherein the solid-state ionic conductor additionally comprises between about 0.1% and about 20% aprotic organic liquid.

18. The positive electrode of claim 15 wherein the solid-state ionic conductor comprises electrolyte salts that form a complex with compounds selected from the group consisting of polyether compounds, polyimine compounds, polythioether compounds, polyphosphazene compounds, polyalkylene oxide compounds, polyethylene oxide compounds, amorphous polyethylene oxide compounds, and combinations thereof.

19. The positive electrode of claim 15 wherein the aprotic organic liquid is selected from the group consisting of sulfolane compounds, dimethyl sulfone compounds, tetrahydrofuran compounds, propylene carbonate compounds, dialkyl carbonate compounds, ethylene carbonate compounds, dimethyl carbonate compounds, butyrolactone compounds, N-methyulpyrrolidinone compounds, tetramethylurea compounds, dioxoyalane compounds, glyme compounds, ether compounds, crown ether compounds, dimethoxyethane compounds, and combinations thereof.

20. The positive electrode of claim 15 wherein the positive electrode includes a gelling agent is selected from the group consisting of polyvinylidine fluoride compounds, hexafluoropropylene-vinylidene fluoride copolymers, polyacrylonitrile compounds, cross-linked polyehter compounds, polyalkyulene oxide compounds, polyethylene oxide compounds, and combinations thereof.

21. The positive electrode of claim 1 wherein the positive electrode contains an ionically conductive material in a gel-state.

22. The positive electrode of claim 21 wherein the ionically conductive material comprises:
a) between about 20% and about 80% of an aprotic organic liquid;
b) gelling agents; and
c) electrolyte salts.

23. The positive electrode of claim 1 wherein the positive electrode further comprises at least one of the following: binders, electrocatalysts, surfactants, dispersants, and protective layer forming additives.

24. The positive electrode of claim 1 wherein the positive electrode is in a solid-state form.

25. The positive electrode of claim 1 wherein the positive electrode is in a gel-state.

26. The positive electrode prepared by a process comprising:
a) mixing active-sulfur, an electronically conductive material, and an ionically conducting material, in a solvent to form a mixture;
b) agitating the mixture for about two clays or until it appears uniform;
c) casting a film of the mixture onto a surface; and
d) allowing the solvent to evaporate, wherein at least about 10% of the active-sulfur in the positive electrode is accessible to electrons and ionic charge carriers.

27. The electrode of claim 26 wherein the surface is an electrically conducting metal surface.

28. The electrode of claim 26 wherein the surface comprises an electrical connector to a current collector.

29. The electrode of claim 26 wherein the surface is a release film surface and the process comprises the additional step of transfering the film to an electrical connector to a current collector.

30. The electrode of claim 26 wherein the active-sulfur in the mixing step is provided in a concentration of between about 40% and about 60% by weight before addition of solvent.

31. The electrode of claim 26 wherein the electronically conductive material is provided in a concentration of between about 8% and about 30% by weight before addition of solvent.

32. The electrode of claim 26 wherein the ionically conducting material is selected from the group consisting of amorphous polyethylene oxide polymers and polyethylene oxide polymers, said polymers complexed with electrolyte salts.

33. The electrode of claim 32 wherein the ionically conducting material contains lithium trifluoromethanesulfonimide and polymer in a concentration of between about 1:8 and about 1:49 molecule of salt per monomer units.

34. The electrode of claim 26 wherein the solvent comprises acetonitrile.

35. The electrode of claim 34 wherein the solvent to amorphous polyethylene oxide ratio is between about 40:1 and about 200:1 by weight.

36. The electrode of claim 26 additionally comprising the step of mixing aprotic organic liquid in amounts between about 0.1% and 20% by weight to the components in step a) before adding solvent.

37. The electrode of claim 26 additionally comprising a step of removing solvent, water, or other liquid traces by exposing the film to a vacuum with or without heat.

* * * * *